(12) United States Patent
Frost et al.

(10) Patent No.: US 8,625,492 B2
(45) Date of Patent: Jan. 7, 2014

(54) TELECOMMUNICATIONS NETWORKS

(75) Inventors: Tim Frost, Madrid (ES); David Fox, Berkshire (GB); Gavin Wong, Berkshire (GB)

(73) Assignee: Vodafone Group PLC, Newbury, Berkshire (GB)

( * ) Notice: Subject to any disclaimer, the term of this patent is extended or adjusted under 35 U.S.C. 154(b) by 133 days.

(21) Appl. No.: 13/055,596

(22) PCT Filed: Jul. 23, 2009

(86) PCT No.: PCT/GB2009/050914
§ 371 (c)(1),
(2), (4) Date: Apr. 12, 2011

(87) PCT Pub. No.: WO2010/010402
PCT Pub. Date: Jan. 28, 2010

(65) Prior Publication Data
US 2011/0199927 A1 Aug. 18, 2011

(30) Foreign Application Priority Data
Jul. 23, 2008 (GB) .................................. 0813476.9

(51) Int. Cl.
*H04W 4/00* (2009.01)
(52) U.S. Cl.
USPC ........................................................ 370/328

(58) Field of Classification Search
USPC ........................... 370/328–339; 455/436–444
See application file for complete search history.

(56) References Cited

U.S. PATENT DOCUMENTS

| | | | |
|---|---|---|---|
| 7,986,915 B1 * | 7/2011 | Wang et al. | 455/7 |
| 2007/0104148 A1 * | 5/2007 | Kang et al. | 370/331 |
| 2007/0160017 A1 * | 7/2007 | Meier et al. | 370/338 |

OTHER PUBLICATIONS

P802.16j, Multihop Relay Specification, IEEE, 286 pages, 2008.*

* cited by examiner

*Primary Examiner* — Frank Duong
(74) *Attorney, Agent, or Firm* — Kratz, Quintos & Hanson, LLP

(57) ABSTRACT

An SAE/LTE or 4G cellular telecommunications network is disclosed which comprises a plurality of eNodeBs 5 and a network core 3. A plurality of mobile telecommunications devices 1 are registered with the network and communicate with the network core 3 via the eNodeBs 5. A joining relay 20 and at least one other relay 22 is provided between the eNodeB 5 and the mobile telecommunications device 1 to extend the radio coverage provided by the eNodeB 5. The joining relay 20 analyses the characteristics of the path between the joining relay and the eNodeB 5 and selectively changes the path to optimise the path.

19 Claims, 16 Drawing Sheets

TELECOMMUNICATIONS NETWORKS

BACKGROUND TO THE INVENTION

The present invention relates to telecommunications networks, and more particularly, but not exclusively, to developments in such networks suitable for adoption in 3GPP SAE/LTE or $4^{th}$ generation (4G) mobile or cellular telecommunications networks that will be implemented in the future.

It is anticipated that SAE/LTE and 4G networks may provide the following advantages, compared to these known networks:—
1. Support interactive multimedia services: teleconferencing, wireless Internet, etc.
2. Wider bandwidths, higher bit rates.
3. Global mobility and service portability.
4. Scalability of mobile networks.

and may be/have:—
5. Entirely packet-switched networks.
6. All network elements are digital.
7. Higher bandwidths to provide multimedia services at lower cost.
8. Tight network security.

BRIEF SUMMARY OF THE INVENTION

According to the present invention, there is provided a mobile telecommunications network including a plurality of nodes, each serving one or more cells, and a network core, wherein a plurality of mobile telecommunications devices are registered with the network and communicate with the network core via ones of the nodes, wherein a plurality of relays, each serving a cell, are provided between at least one of said nodes and at least one of said telecommunications devices to extend the radio coverage provided by the said node, wherein one of said relays comprises a joining relay which is operable to connect to said node via another of said relays, the network including means for analysing characteristics of a path between the joining relay and the network core and for selectively changing the path to facilitate optimisation of the path between the joining relay and the network core.

The said node may be an eNodeB.

In a first embodiment the said node includes the analysing means. The analysing means is operable to receive neighbour cell information from the joining relay. In the first embodiment the information from the joining relay is sent directly to the said node. In a third embodiment, which is a modification of the first embodiment, the information from the joining relay is sent to the said node via said another relay.

In these embodiments, the said node is operable to analyse the characteristics of the path portion between each of the neighbour cells and the said node and to analyse the characteristics of the path portion between the joining relay and each of the neighbour cells in order to determine the optimum path between the joining relay and the said node.

In a second embodiment the joining relay includes the analysing means, and the analysing means is operable to receive information regarding the characteristics of the path portion between the neighbour cells of the joining relay and the said node. The joining relay may be operable to measure neighbour cell characteristics and to select the path between the joining relay and the said node, which includes one of the neighbour cells, in dependence upon the neighbour cell characteristics and the characteristics of the path portion between each of the neighbour cells of the joining relay and the said node.

In a fourth embodiment of the invention the network includes means for changing the path between the joining relay and the network core, which path includes said another relay, comprising means operable to cause the said joining relay to detach any of said mobile telecommunications devices attached thereto and means operable to cause the joining relay to detach from said another relay.

In a fifth embodiment, the network includes means for changing the path between the joining relay and the network core, which path includes said another relay, comprising means operable to trigger a handover of the joining relay from said another relay to a further one of said relays or to a further one of said nodes.

The invention also relates to the methods of operating a telecommunications network as defined in the claims.

BRIEF DESCRIPTION OF THE DRAWINGS

For a better understanding of the present invention an embodiment will now be described by way of example with reference to the accompanying drawings in which.

In the drawings like elements are generally designated with the same reference sign.

DETAILED DESCRIPTION OF EMBODIMENTS

Overview of SAE/LTE Network

Figure 1:
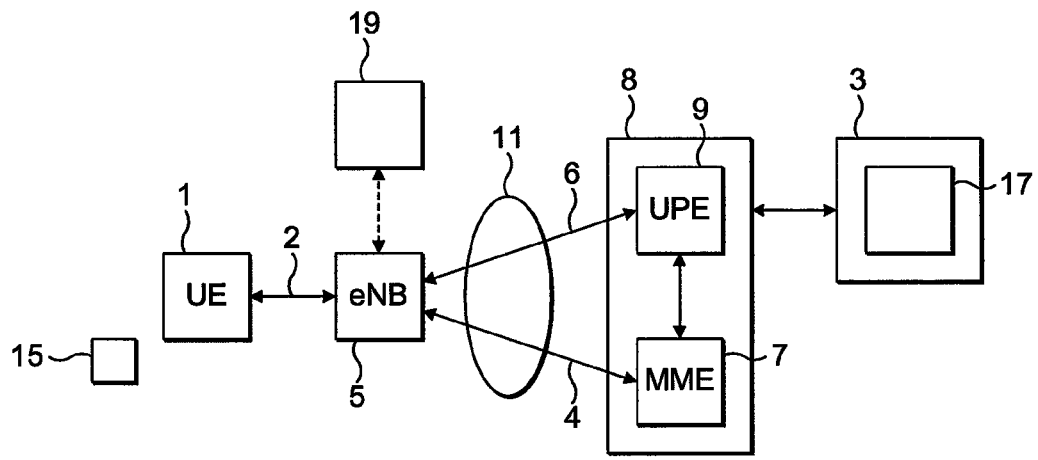
FIG. 1 shows the elements of an SAE/LTE 4G network.

FIG. 1 shows schematically the logical elements of a SAE/LTE cellular telecommunications network. Mobile terminal (UE) 1 is registered with mobile telecommunications network core 3. The mobile terminal 1 may be a handheld mobile telephone, a personal digital assistant (PDA) or a laptop or desktop personal computer—for example, equipped with a wireless datacard. The device 1 communicates wirelessly with the mobile telecommunications network core 3 via the radio access network (RAN) of the mobile telecommunications network core 3 over radio interface 2. The RAN comprises an eNodeB 5. An eNodeB 5 performs functions generally similar to those performed by the nodeB and the radio network controller (RNC) of a 3G network. In practice there will be a multiplicity of eNodeBs 5, each serving a particular area or "cells". Each eNode B is coupled to an antenna device.

The eNode B and antenna device form a cell site. The cell site provides radio coverage to a plurality of cells, e.g. three. Typically, the cell site will only provide radio coverage for a portion of each of the cells. Other portions of each of the cells are provided with radio coverage and by other cell sites.

Signalling in a mobile telecommunications network can be considered to be separated into "control plane" signalling and "user plane signalling". The control plane performs the required signalling, and includes the relevant application protocol and signalling bearer, for transporting the application protocol messages. Among other things, the application protocol is used for setting up the radio access bearer and the radio network layer. The user plane transmits data traffic and includes data streams and data bearers for the data streams. The data streams are characterised by one or more frame protocols specific for a particular interface. Generally speaking, the user plane carries data for use by a receiving terminal—such as data that allow a voice or picture to be reproduced—and the control plane controls how data are transmitted. A Packet Data Network Gateway (PDN-GW) terminates the user plane within the core 3.

A PDP (packet data protocol) context defines parameters that support the flow of data traffic to and from a mobile terminal. Among the parameters that are set are the identifier of the external packet data network with which the terminal wishes to communicate, a PDP address recognised in that network (for example, the IP address allocated to the mobile terminal), the address of the network gateway, quality of service (QoS) parameters etc.

A mobility management entity (MME) 7 provides equivalent functions to the control plane functions of the SGSN and GGSN from the 3G architecture (Release-6). The MME handles security key management. The MME also provides control plane function for mobility between LTE and GSM/UMTS networks. Communications between the eNodeB 5 are transmitted to the MME 7 via the S1-c Interface 4.

A user plane entity (UPE) 9 handles the user plane traffic functions from the terminal 1 which includes the IP header and payload compression and ciphering. This UPE 9 provides the equivalent functions to the user plane part of the 3G RNC and the user plane part of the 3G GGSN. Communications between the eNodeB 5 are transmitted to the UPE 7 via the S1-u Interface 6. The known 3GPP authentication procedure may be re-used in the SAE/LTE architecture shown, between the terminal 1/UE and the MME 7.

It should be noted that, although in FIG. 1 the MME 7 and UPE 9 are shown as separate logical entities they may exist as a single physical node of the telecommunications network in gateway aGW 8.

Data are transmitted between the eNodeB 5 and the MME 7 and UPE 9 via IP transport network 11.

Although only one mobile terminal 1 is shown, there will in practice be a multiplicity of mobile terminals, each of which is registered with the network core 3. Each mobile terminal (including mobile terminal 1) is provided with a respective subscriber identity module (SIM) 15. During the manufacturing process of each SIM, authentication information is stored thereon under the control of the mobile telecommunications network core 3. The mobile telecommunications network core 3 itself stores details of each of the SIMs issued under its control. In operation of the mobile telecommunications network core 3, a terminal 1 is authenticated (for example, when the user activates the terminal in the network with a view to making or receiving calls) by the network sending a challenge to the terminal 1, incorporating a SIM 15, in response to which the SIM 15 calculates a reply and a key (dependent on the predetermined information held on the SIM—typically an authentication algorithm and a unique key Ki) and transmits the reply back to the mobile telecommunications network core 3. The mobile telecommunications network core 3 includes a Home Subscriber Server (HSS) 17 which has an authentication processor which generates the challenge. Using information pre-stored concerning the content of the relevant SIM 15, the authentication processor calculates the expected value of the reply from the mobile terminal 1 and the key. The authentication processor sends the challenge, reply and key to the MME 7. The MME 7 sends the challenge to the mobile terminal 1. If the reply received by MME 7 matches the expected calculated reply, the SIM 15 and the associated mobile terminal 1 are considered to be authenticated. After the authentication process has been completed, the SIM 15 and MME 7 share a cipher key which can be used to protect subsequent communications. Integrity keys are generated and derived alongside the cipher keys. The integrity keys are used to integrity protect each of the secured links. The ciphering keys for each of the secured links are passed to the eNodeB 5, MME 7 and UPE 9.

It should be understood that such an authentication process can be performed for any terminal provided with a SIM 15 under control of the mobile telecommunications network core 3. Although the terminal 1 may communicate wirelessly with the mobile telecommunications network core 3 via the network's radio access network, this is not essential. For example, the terminal may communicate with the network via the fixed telephone network (PSTN), via a UMA access point, via WLAN and/or via the Internet.

If a USIM is used the authentication process is enhanced to provide the capability for the terminal to authenticate the network and to have assurance about the freshness of the key established as a result of the authentication process. In addition authentication using a USIM can generally be used to establish longer keys than if a SIM were used.

The SIM may also be a Universal Integrated Circuit Card (UICC).

Mobile telecommunications networks have an active state of communication with their mobile terminals and an inactive/idle state of communication with their terminals. When in the active state, as the mobile terminals move between different cells of the network, the communication session is maintained by performing a "handover" operation between the cells. In the inactive/idle state, as a mobile terminal moves between different cells of the network the mobile terminal performs "cell reselection" to select the most appropriate cell on which to "camp" in order that the mobile terminal can be paged by the network when mobile terminating data is destined for that mobile terminal.

Conventionally, the mobile terminal or network determines whether a handover/cell reselection procedure should be triggered in dependence upon measurements of the radio signals of the cells in the region of the mobile terminal. A filter is applied to the signals (either by the network or by the mobile terminal) which calculates an average (e.g. arithmetical mean) value of these signals over a particular time period. This filtered/average values of the cells are then compared with each other or with a threshold value. In dependence upon these comparisons, cell reselection/handover related procedures are triggered. This cell reselection/handover process generally comprises taking radio signal measurements of neighbouring cells and comparing these to each other and to the radio signal of the current cell to determine which cell provides the best signal strength/quality. Handover/reselection to the best cell can then occur.

Generally calculations to determine whether to perform a handover from one base station to another base station are performed by the network, whereas calculations whether to perform cell reselection are performed by the mobile terminal.

Hereinafter, the term "handover" is used to refer to both active state and inactive/idle state transfer between cells.

The following abbreviations are used in the description:

| Term | Definition |
| --- | --- |
| 3RC | Relay Radio Resource Control |
| Cell ID | Cell Identity |
| Child Relay | The Relay which is the next hop towards the UE. |
| Controlling Relay | The Relay which is directly connected to the UE. |
| eNB/eNodeB | E-UTRAN Node B (Basestation, containing one or more cells, each with their own Cell ID) |
| Intermediary Relay | The Relay which is in the transmission path between a Relay and the eNodeB |
| LTE | Long Term Evolution |
| MRCF | Macro Resource Control Function |
| Parent Node | The Relay or eNodeB that is directly controlling this entity. |
| PDCP | Packet Data Convergence protocol |
| PDN | Packet Data Network |
| Relay Cluster | The tree of Relays (and their cells) which connect through a single cell hosted by an eNodeB. |
| RLC | Radio Link Control protocol |
| RRC | Radio Resource Control protocol |
| RRM | Radio Resource Management |
| RTC | Relay Transport Control |
| UE | User Equipment |
| X2 | X2 interface - The LTE interface which runs between eNodeBs |

Figure 2:
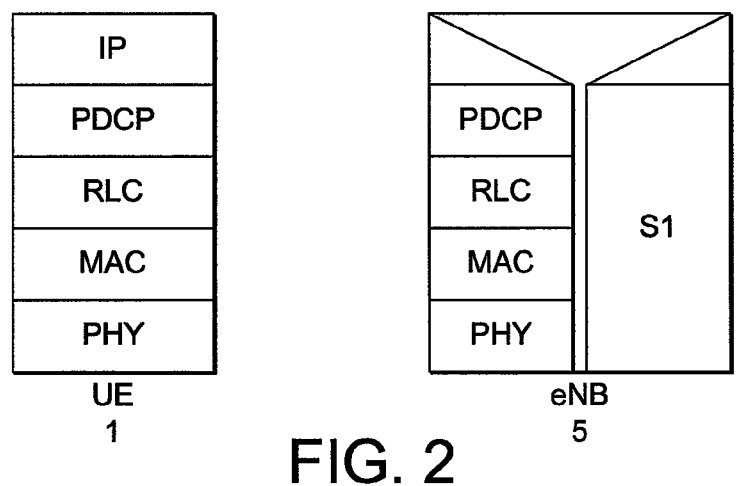
FIG. 2 shows the UE-eNodeB protocol stack.

FIG. 2 shows the UE-eNodeB protocol stack.

The eNodeB hosts the PHYsical (PHY), Medium Access Control (MAC), Radio Link Control (RLC), and Packet Data Control Protocol (PDCP) layers that include the functionality of user-plane header-compression and encryption. The eNodeB also provides Radio Resource Control (RRC) functionality corresponding to the control plane. The eNodeB further provides many additional functions including radio resource management, admission control, scheduling, enforcement of negotiated uplink (UL) QoS, cell information broadcast, ciphering/deciphering of user and control plane data and compression/decompression of downlink (DL)/UL user plane packet headers.

In the control-plane, the RRC layer in the eNodeB makes handover decisions based on neighbour cell measurements sent by the UE, pages for the UEs over the air, broadcasts system information, controls UE measurement reporting such as the periodicity of Channel Quality Information (CQI) reports and allocates cell-level temporary identifiers to active UEs. It also executes transfer of UE context from the source eNodeB to the target eNodeB during handover, and performs integrity protection of RRC messages. The RRC layer is responsible for the setting up and maintenance of radio bearers.

Figure 3:
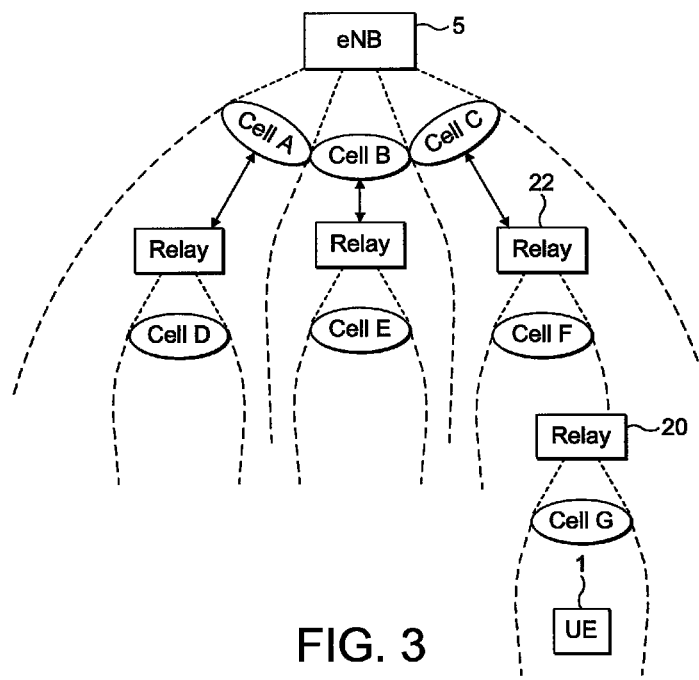
FIG. 3 shows the radio coverage provided by cells of an eNodeB and relays, in accordance with the embodiment of the invention.

FIG. 3 shows the radio coverage provided by cell A, cell B and cell C of an eNodeB 5. In order to improve the coverage provided by the eNodeB 5 one or more relays may be used to provide additional cells D, E, F and G. To a UE a relay has the same "appearance" as a cell. However, the relay has a unique cell ID, different from the cell ID of the eNodeB 5 cell that the relay connects through, and performs unique system information transmission to the UE. Similarly, the relay "appears" to the eNodeB 5 as a UE.

Relays connect wirelessly to other relays, eNode Bs and UEs. For example a relay may receive wirelessly downlink data from an eNode B that is destined for a particular UE. The relay then passes that downlink data to the UE. This is advantageous in the event that the UE is not in the radio coverage area of the eNode B. The relay enables the UE to receive data even when the UE is not in the radio coverage area of the eNode B. Similarly, a relay enables uplink data to be transmitted from a UE to an eNode B.

To facilitate connection to an eNode B and a UE, a relay is provided with a SIM that is registered with the network of the eNode B and UE.

One or more relays may be provided in the communication path between the UE 1 and the eNodeB 5 (relays 20 and 22 in FIG. 3). The relay 20 closest to the UE 1 in the communication path is a "controlling relay". Advantageously, the number of relays in the communication path between a UE 1 and an eNodeB 5 is scaleable. The design of a relay is the same when it is connected directly to the eNodeB 5 and when it is connected to another relay in the communication path between the eNodeB 5 and the UE 1. The relays are arranged in a tree structure.

Advantageously, the present embodiments seek to preserve the security conventionally provided between the UE and the eNodeB. The security architecture can be split into:

(1) the relay security architecture, which in this case is the control protocols used between the relays, and between the relay and the eNode B such that the UE security architecture can be predominantly reused for the relay security architecture and security management in the core network; and (2) the UE security architecture, which is the adaptation of the existing LTE security architecture for use in the relays by extending the UE security architecture over the secure connection between the eNodeBs and controlling-relay.

Figure 4:
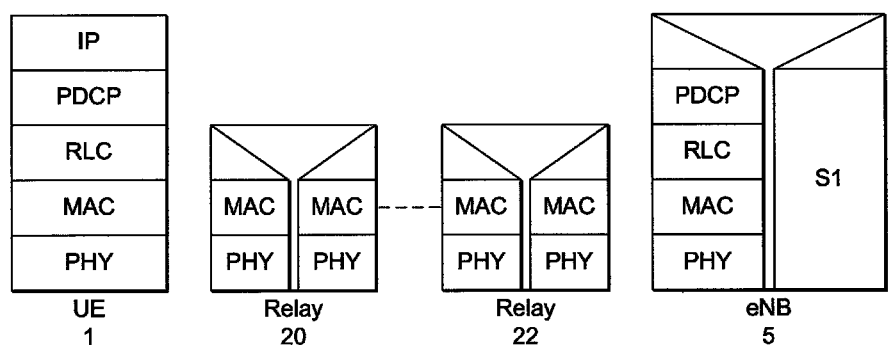
FIG. 4 shows the UE-eNodeB user plane.

FIG. 4 shows a first relay 20 and a second relay 22 in the communication path between the UE 1 and the eNodeB 5. In the UE-eNodeB user plane, the main characteristics of the user plane design are:

The buffer status reporting and scheduling completed on a hop-by-hop basis, controlled by the parent node such that resources are shared between users based on available payload, and relative radio conditions of each link to maximize system throughput.

H-ARQ terminated on each hop such that the link throughput can be maximized based on the instantaneous radio quality on the link.

The RLC-SDU is passed complete to the next hop by the relays to maintain security from eNodeB to UE. The ciphering for the UE user plane runs between the UE and the eNodeB, transparently over the Relays.

Figure 5:
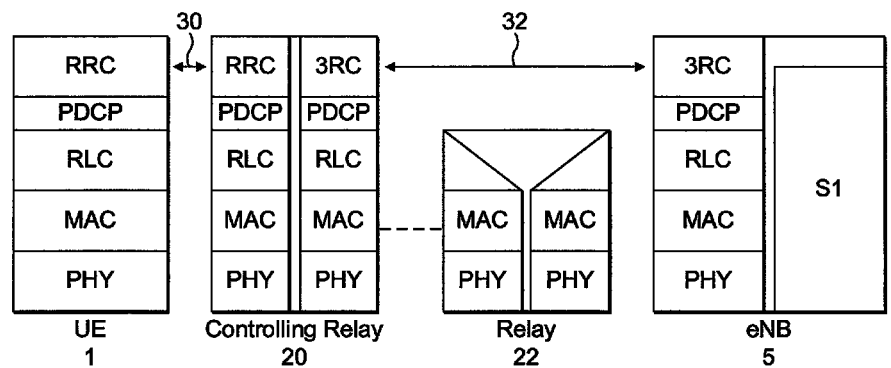
FIG. 5 shows the UE-eNodeB control interfaces.

FIG. 5 shows the UE-eNodeB control interfaces. The RRC 30, including its ciphering and integrity protection, runs between the UE and the controlling relay. The RRC signalling for the UE, such as handover messaging, is tunnelled between the controlling relay 20 and the Multimedia Resource Control Function (MRCF) in the eNodeB 5 using a new protocol, referred to hereinafter as 3RC protocol 32. The 3RC protocol passes UE specific signalling directly from the controlling relay 20 to the eNodeB 5 where it can be routed to the correct destination, either along the S2 interface or S1 interface. The 3RC protocol is also used by the eNodeB 5 to configure the controlling relay 20.

The intermediary 22 relay in FIG. 5 only performs the routing of the RLC packets between the eNodeB 5 in the controlling relay 20. The PDCP frames are ciphered between the eNodeB 5 and the controlling relay 20. This uses the ciphering key defined for the controlling relay's user plane. The 3RC protocol may include a MAC field for integrity protection.

In FIG. 5 the security between the UE 1 and the controlling relay 20 is the same as the security between the UE 1 and the eNodeB 5. The embodiment provides the 3RC protocol between the controlling relay 20 and the eNodeB 5 to facilitate tunnelling of RRC signalling between the controlling relay 20 and the eNodeB 5.

In FIG. 5 only the RRC layer is modified compared to the conventional protocol stack. The PDCP, RLC, MAC and PHY layers are the same, and operate in the same way, as if the eNodeB 5 communicated directly with the UE 1.

Figure 6:
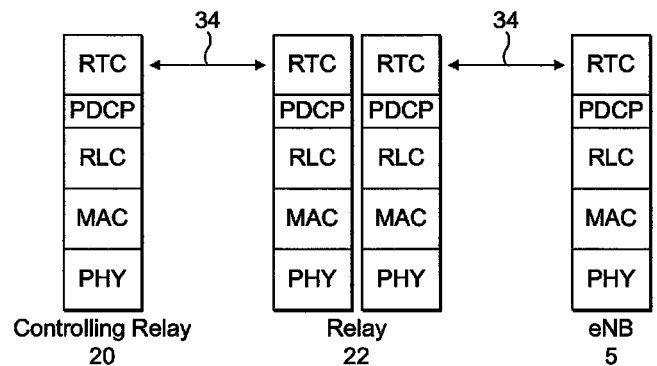
FIG. 6 shows Relay Transport Control protocol between a controlling relay and an eNodeB.

FIG. 6 shows the relay transport protocol. A Relay Transport Control (RTC) protocol 34 is provided to establish transport links between a relay and its parent node (eNodeB 5), and to remove the transport links when they are no longer required. The protocol uses some aspects of RRC, particularly with respect to the initial access procedure, which initiates the connection of the relay to its parent. The RTC protocol is also used to pass batched buffer status reporting to the next hop node if required, such that the radio resources can be targeted to the link where it is most needed due to challenging radio conditions and/or greater demand. The link is ciphered and integrity protected using the keys defined for the RRC of the relay, and runs from the relay to its parent node.

The multi-hop Relay system introduces new challenges compared to a single-hop relay system particularly with respect to the route/connectivity selection.

With a single-hop Relay system, the Relay can determine which cell in the vicinity provides the best coverage, and the Relay will use this cell for connectivity to the appropriate eNodeB of the Operator network. The process that this Relay uses to determine the correct cell is similar to the process that a UE would use to determine the best cell, as is well known to those skilled in the art.

However with a multi-hop Relay system, the Relay route through which the Relay connects to the Operators network is not purely determined by the quality of the link between the Relay and its Controlling node, it also needs to take into account the link quality and load of the links between the Controlling node and their Parent eNodeB, as well as the interference to neighbouring cells.

Figure 7:
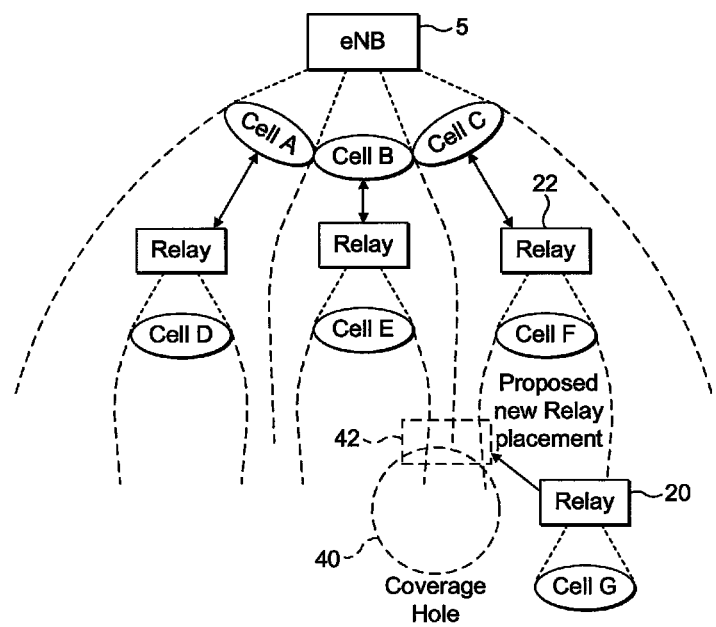
FIG. 7 shows introduction of a new Relay into the Relay System to provide coverage to a coverage gap.

FIG. 7 illustrates the issue faced in introducing a new Relay into the Relay System to provide coverage to the area highlighted by the dashed circle 40. When the new (joining) Relay supporting "Cell G" is introduced into the system to provide coverage infill at the position shown by the dashed box 42, there is reasonable coverage from Cell E, Cell B, Cell C and Cell F for the position of the joining relay. The embodiments to be described are concerned with providing a Relay with connectivity to an eNodeB.

To understand the invention it is first useful to appreciate the initial connectivity of a joining relay into the relay system.

Figure 8A:
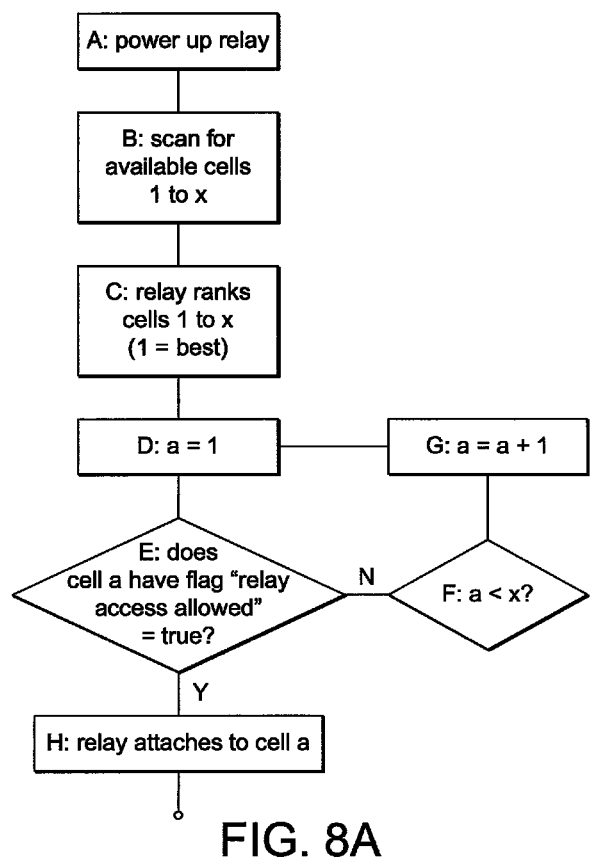
FIGS. 8A to 8C are a flow chart explaining a first embodiment to the invention in which optimised reconnection is performed by centralised route control.
Figure 8B:
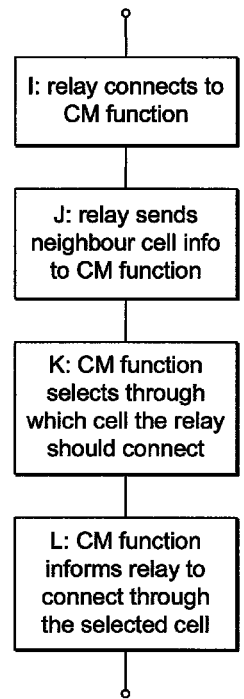
Figure 8C:
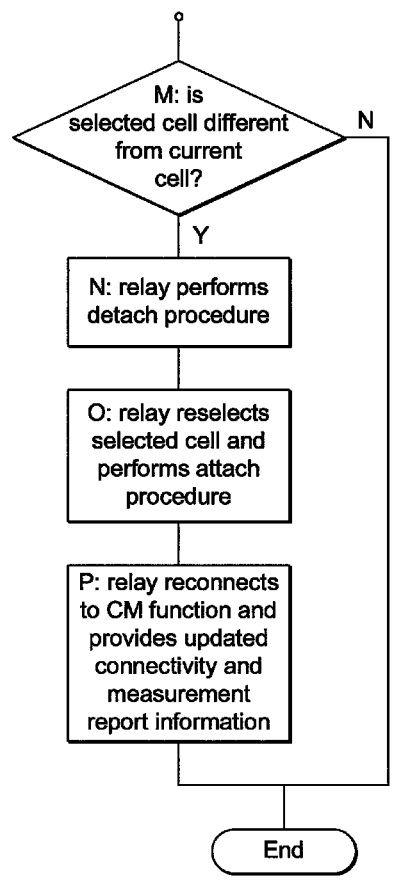

With reference to the flow chart of FIGS. 8A, 8B and 8C the joining Relay (in Flow 1) determines the best route to the eNode B 5 of the network to maximize the total system throughput as follows: —

1) When the joining Relay is powered up (step A), the joining Relay scans for cells on the Carrier Frequency or Frequencies which the joining Relay has been pre-configured to use (step B), and builds a list of possible cells. Each cell may be served by an eNode B or another relay. The joining Relay ranks the cells (step C) according to radio quality. The best cell is ranked "1" and is considered first by setting this variable a to "1" (step D). The joining relay then determines if that cell is suitable, by the suitability criteria that the cell broadcasts.

2) The joining Relay analyses the System Information of the cell and determines whether the flag "Relay Access Allowed" is "True" or "False" (step E):

a. The "Relay Access Allowed" flag is generally set to "True" for: (i) an eNodeB which has the necessary functionality to support Relays; (ii) Tier-n Relays if n<maxRelayTiers (where maxRelayTiers is the maximum number of hops allowed in the system by the standard or the operator)—i.e. the number of relays between the relay to which the joining relay will connect and the eNodeB is less than a predetermined maximum value; and (iii) a Relay that has been told (by the eNodeB or O&M/SON—(Operations & Maintenance) Self-Optimising Network—Server) that it has sufficient link quality to support Child Relays.

b. Also the joining Relay may indicate whether it is the end Relay (a relay with no child relays), or whether it is a higher tier relay, as this gives the eNode B an indication of how much bandwidth would be needed. Alternatively the joining Relay can indicate explicitly how much bandwidth is needed.

If cell a does not have the "Relay Access Allowed" flag set to true, and there are further cells to consider (step F), the value of a is incremental (step G) and the next ranked cell is considered by repeating step E. Step E (and step F and G) are repeated until a suitable cell is found on the lowest ranked cell has been considered (a=x).

Note: for all below solutions the cell of the joining Relay is not in service, i.e. it is not being transmitted at this time.

In a first embodiment of the invention (in FIGS. 8A, 8B and 8C) centralised route control is used:

A-3) The joining Relay selects the cell which has the best radio quality, and that has the "Relay Access Allowed" flag set to "True" (as described in steps A to G above); and then Attaches to the network to acquire network connectivity (step H):

a. The joining Relay (in a similar manner to a UE) performs the Initial Access procedure to its Parent Node (eNode B), and then sends the ATTACH message (of the NAS Control Protocol) to the MME. The joining Relay in this case would not include an APN (Access Point Name) or any other special information. The subscription stored in the HSS associated with the SIM contained in the joining Relay would be configured with either the APN or with an IP address associated with a PDN-GW which is connected to the Management Network of the Operator. The PDN GW selected would have particular properties for handling relay nodes, e.g. with optimised connection to Device management server and/or the ability to use the ID of the cell the Relay is using on the eNodeB to select the correct device management server. Interactions between the PDN-GW and network servers can occur, e.g. using RADIUS and/or Diameter protocols and the Cell ID can then be passed from the PDN-GW to the network server to permit connection to and/or selection of the correct Network Management Server.

b. In the Initial UE message which is carrying the Attach message the eNodeB includes the Cell ID of the cell which the joining Relay is connecting through on the eNodeB, and in addition it may also include the Cell ID of the Intermediary Relays. The Cell ID information is passed to the HSS when the subscription information is retrieved. The O&M server, SON server or OMA DM server can then query the HSS for the Cell ID of the parent cell of the joining Relay to determine which configuration information to load on the joining Relay. Additionally a change in the Cell ID of an Intermediary Relay can be used to determine whether the joining Relay has been moved around the network.

c. The joining Relay is allocated a Default SAE Bearer which only has connectivity to the Management Network of the operator. The joining Relay can either use DHCP to request an IP address, with the DCHP Response including the IP address of the SON/O&M Server to be used to retrieve the configuration; or the joining Relay is allocated an IP address as part of the Attach process. The joining Relay needs to be configured with the FQDN of the configuration server to be used for the device configuration—this may be an O&M server, SON server or OMA DM server.

A-4) The joining Relay connects to the CM (Connection Management) Function (step I), the function which is in charge of network connectivity. The CM Function may be located in one of: eNodeB, O&M server, SON server or OMA DM server. The joining Relay packages up the measurements it has made of the neighbour cells (from steps B to G above) and passes them to the CM function (step J).

a. The measurements may include or consist of the following information:
 i. CGI (Cell Global Identity) of cell, taken from the system information of the measured cell;
 ii. Downlink Signal strength;
 iii. Downlink Signal quality;
 iv. Relative difference in synchronisation using the parent cell as the timing reference;
 v. Uplink TA (Timing Advance) used on parent cell;
 vi. Indication of whether the "Relay Access Allowed" flag is set to "True".

A-5) The CM function analyses the Measurements provided by the joining Relay (information elements i to vi above). The CM Function determines which of the CGIs received in the Measurements belong to other Relays, and which are directly controlled by eNodeBs. For the measurements of other Relays, the CM Function looks up in its RRM Database (a database of historical information about the link quality/budget for that Relay to its Controlling eNodeB) for each Relay listed by the joining Relay, which takes into account any Intermediary Relays (and the quantity). The CM Function then equates this link quality/budget of that Controlling Relay to a Penalty Offset which is applied to the Downlink Signal Strength/quality measurements provided by the eNodeB. The CM function then, using this information, selects through which Relay or eNodeB the joining Relay should connect (step K).

A-6) The CM Function responds to the joining Relay, informing the joining Relay which cell the joining Relay should connect through (step L).

A-7) If the selected cell is different from the current cell (step M), the joining Relay performs the standard network detach procedure and is released from the network (step N).

A-8) The joining Relay reselects to the cell which was specified by the CM Function and performs the Attach procedure (step O). Once attached to the network the joining Relay reconnects to the CM Function and provides updated connectivity and measurement report information (step P), which the CM Function stored in the RRM Database.

Figure 9A:
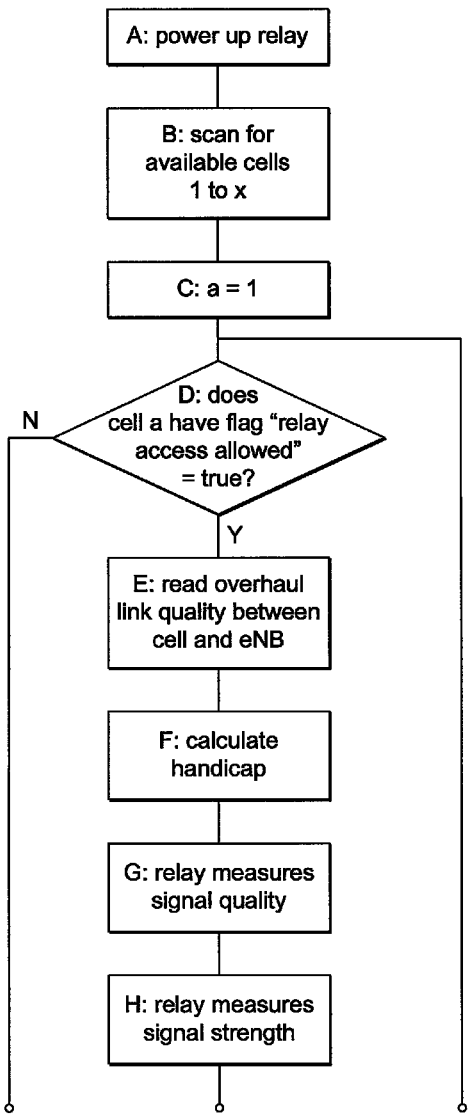
FIGS. 9A and 9B show a flow chart explaining a second embodiment of the invention for optimising reconnection in which system information based route control is used.
Figure 9B:
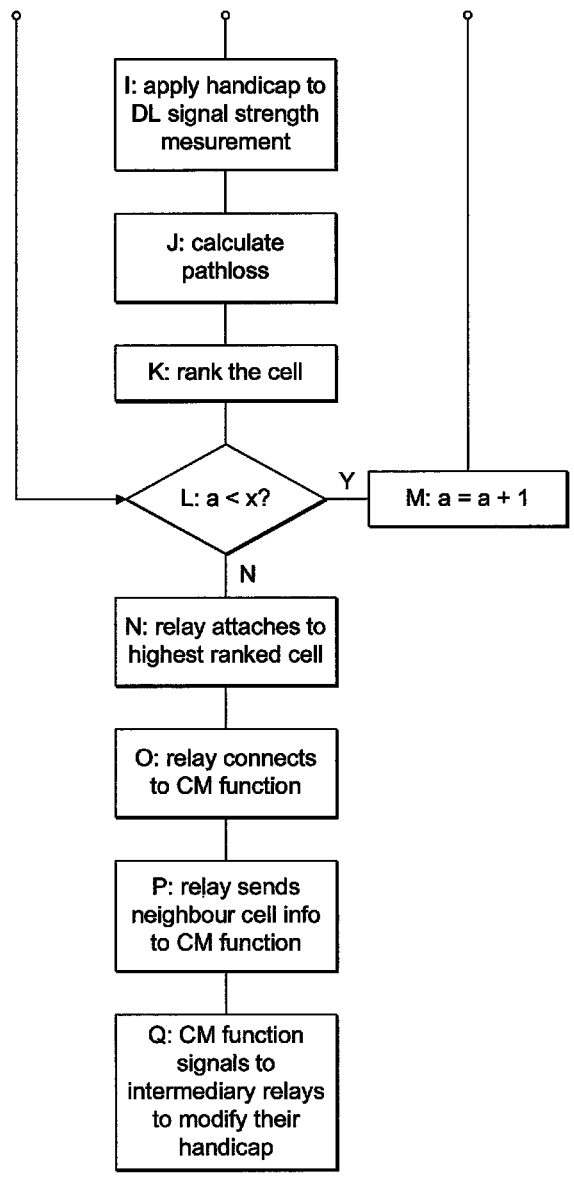

In a second embodiment of the invention (Flow 2) system information based route control is used, which will now be described with reference to FIGS. 9A and 9B.

As in the first embodiment, when the joining Relay is powered up (step A), the joining Relay scans for cells on the Carrier Frequency or Frequencies which the joining Relay has been pre-configured to use (step B). The first cell is considered by setting variable a to "1" (step C). The joining relay then determines if the cell is suitable, by the suitability criteria that the cell broadcasts. The joining relay checks whether the "Relay Access Allowed" flag is true for the cell (step D).

B-3) On the system information of each cell which has the "Relay Access Allowed" flag set to "True", a new field is included which indicates the backhaul link quality between that cell and the eNodeB—the field provides two new parameters both coded in dBm (step E), and provides figures for a handicap that should be applied to the measured signal quality and measured Signal Strength of that cell (step F). The joining Relay also reads the system information to find the output power of the cell.

B-4) The joining Relay measures the signal quality (step G) and signal strength (step H) of each of the cells which allow Relay Access, and:
 a. Applies the handicap to the downlink signal strength measurement (step I);
 b. Calculates the pathloss of the cell based on the signalled output power, and the received output power (step J)—to ascertain the possible uplink link budget/interference.
 c. Ranks the cell based on an average of the downlink signal strength (with handicap applied), downlink signal quality measurement and uplink link budget calculation (step K).

As step L it is determined whether there are further cells to consider; if there are (i.e. if a<x), the value of a is incremental at step M, and steps E to M are repeater for the next cell. This continues until all cells have been considered.

B-5) The joining Relay camps on the highest ranked cell, and attaches (step N) to the network to acquire network connectivity, in a similar manner to (A-3) above. The joining relay connects to the CM function (step O) and sends neighbour cell information to the CM function (step P) in a similar manner to (A-4) above.

B-6) The CM Function signals in step Q to the Intermediary Relays to modify their handicap they transmit in their System Information, based on the measurements the joining Relay has provided in step P, and the assumed load the new Relay will introduce into the Relay system.

Figure 10A:
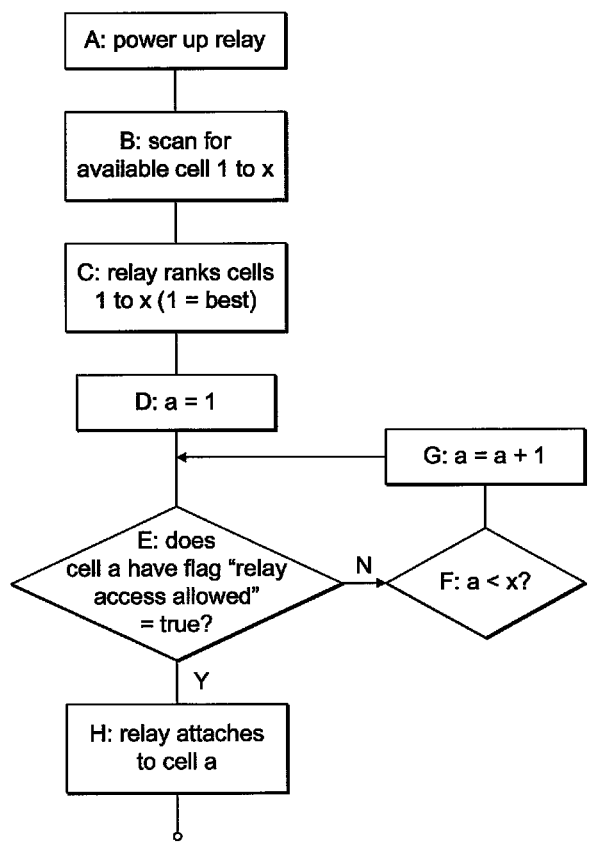
FIGS. 10A and 10B are a flow chart for explaining a third embodiment of the invention in which optimised reconnection is performed using handover based route control.
Figure 10B:
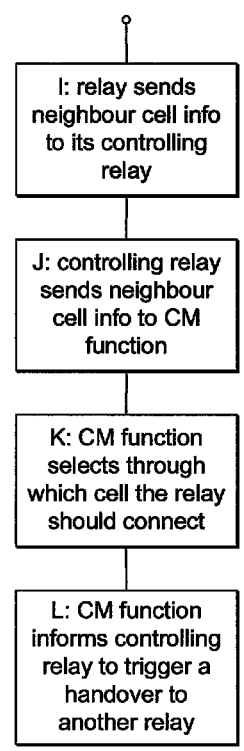

In a third embodiment of the invention (Flow 3) handover based route control is used, and will now be described with reference to FIGS. 10A and 10B.

C-3) The joining Relay uses the normal cell selection rules defined for a UE, and filters based on whether "Relay Access is Allowed" is step to "time". For example, steps A to G of flow 1 are performed. When the joining Relay is powered up (step A), the joining Relay scans for cells on the Carrier Frequency or Frequencies which the joining Relay has been pre-configured to use (step B), and builds a list of possible cells. The joining Relay ranks the cells (step C). The best cell is ranked "1" and is considered first by setting this variable a to "1" (step D). The joining relay then determines if the cell is suitable, by the suitability criteria that the cell broadcasts. The joining Relay analyses the System Information of the cell and determines whether the flag "Relay Access Allowed" is "True" or "False" (step E). If cell a does not have the flag set to true, and there are further cells to consider (step F), the value of a is incremental (step G) and the next ranked cell is considered by repeating step E. Step E (and step F and G) are repeated until a suitable cell is found on the lowest ranked cell has been considered (a=x). The joining Relay accesses the best cell where "Relay Access is Allowed" and performs the Attach procedure (step H).

C-4) The joining Relay generates measurement reports for its Controlling Relay (in step I) (as in A-4 above) but the measurement reports are sent to the Relay to which the joining relay connects (that is, the joining relay's controlling relay) and are not sent to the CM-Function). The controlling relay then contacts the CM Function located in the eNodeB and passes this information to the CM function (step J).

C-5) When the Controlling Relay is provided with a response from the CM Function (step K), it may trigger a handover of this Relay to one of the other Relays, or eNodeBs in the list of measured cells. The Handover is performed as though this Relay was just another UE (step L). The Handover messaging between the Controlling Relay and the new Controlling Relay includes an indication that the incoming handover is for a Relay.

It should be noted that this last embodiment avoids the Relay having to re-initialise the Access Security.

The present invention also addresses the optimisation of relay connections into the relay system in a fourth embodiment now described with reference to FIGS. 11A to 11D. To appreciate this one must first consider basic reconnection technique.

Once the Relay is connected into the Relay System it is assumed that in the known First Release proposal that there will be no mobility for the Relay whilst it is providing connectivity for UEs, as this would require a complicated mechanism to handover multiple UEs between cells. The present embodiment provides a mechanism to move the UEs off a Relay such that the Relay can again be re-connected into the Relay system in the best manner for system efficiency.

The CM Function is Responsible for the determining when a Relay Connectivity Route needs to be modified (step A). The CM Function starts by triggering disconnection of the Relays furthest from the eNodeB on any branch that needs to be re-organised (step B); so when the CM Function triggers a Relay to re-connect in a different position in the tree (step C), it should have no child Relays connected to it, only UEs.

The CM Function informs the Relay of the Re-connection, and the Relay starts to offload the UEs that are connected through this Relay by triggering their individual handover to neighbouring cells. A new indication is included in the Handover message between the network entities such that the handover statistics for use in future handovers are not affected.

The CM Function only triggers one Relay at a time to Re-connect, and therefore minimises the ping-pong of UEs between Cells.

When the Relay has emptied itself of UEs and it then slowly powers down the common pilot symbols of the cell (step D).

Figure 11A:
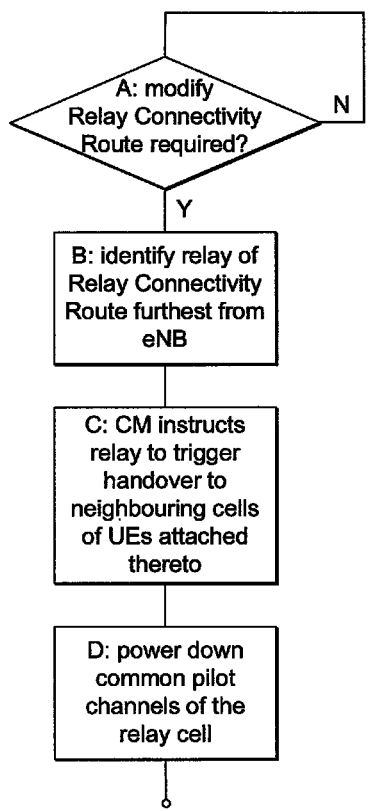
FIGS. 11A to 11D show flow charts for performing optimisation of relay connection into a relay system in accordance with a fourth embodiment of the invention.
Figure 11B:
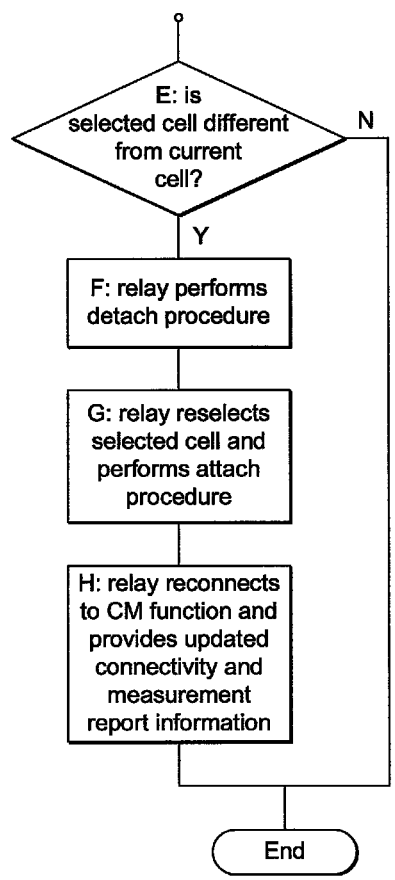

As shown in FIG. 11B, if the selected cell is different from the current cell (step E), the joining Relay performs the standard network detach procedure and is released from the network (step F)—as in A7 above. The joining Relay reselects to the cell which was specified by the CM Function and performs the Attach procedure (step G). Once attached to the network the joining Relay reconnects to the CM Function and provides updated connectivity and measurement report information (step H), which the CM Function stored in the RRM Database—as in A8 above.

Figure 11C:
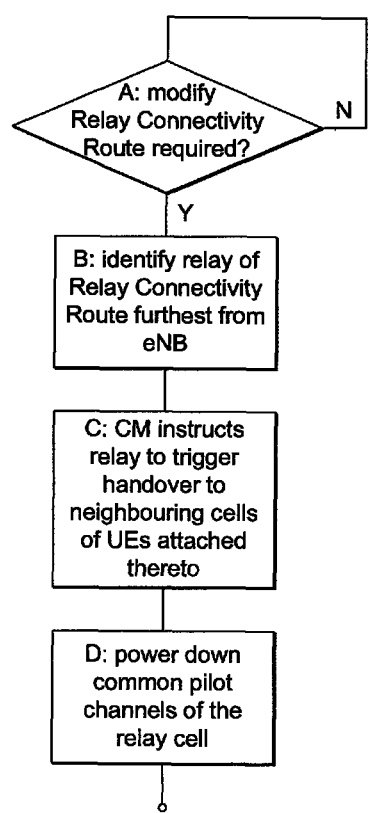
Figure 11D:
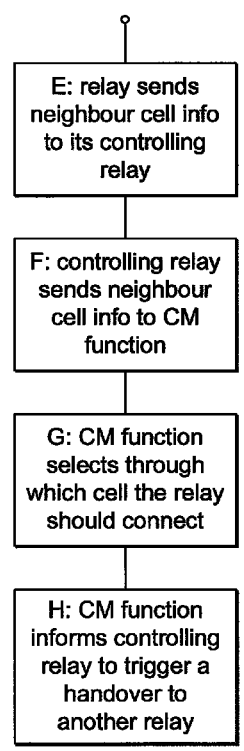

In a variation of the fourth embodiment, as shown in FIGS. 11C and 11D, steps A to D are performed as in FIG. 11A. Then, as shown in FIG. 11D, the Relay generates measurement reports for its Controlling Relay (in step E) (as in C-4 above) and the measurement reports are sent to the controlling Relay. The controlling relay contacts the CM Function located in the eNodeB and passes this information to the CM function (step F)—as in C-4 above. When the Controlling Relay is provided with a response from the CM Function (step G), it may trigger a handover of this Relay to one of the other Relays, or eNodeBs in the list of measured cells. The Handover is performed as though this Relay was just another UE (step H). The Handover messaging between the Controlling Relay and the new Controlling Relay includes an indication that the incoming handover is for a Relay—as in C-5 above.

Note: If a handover based route control solution is adopted, the need for Relay having to re-initialise the Access Security is avoided.

Figure 12:
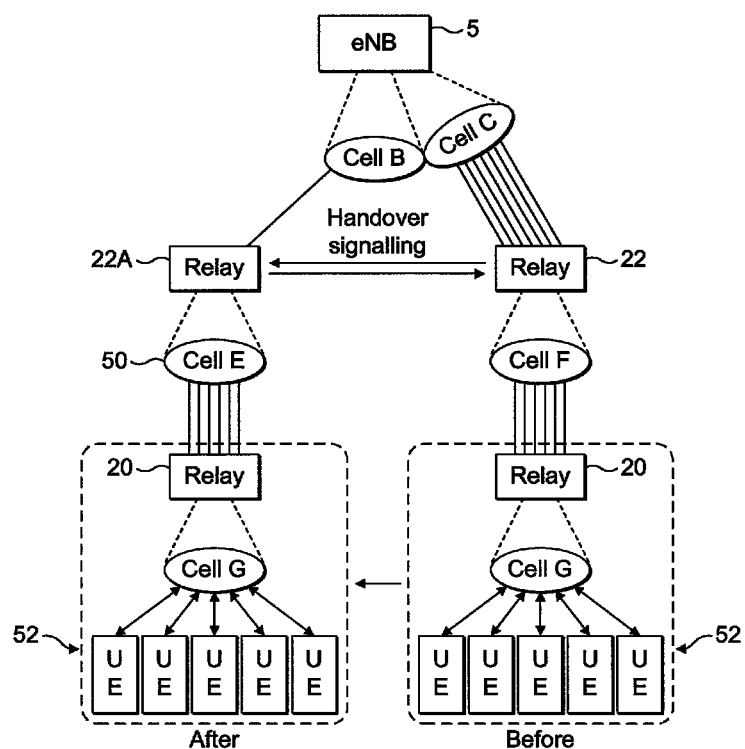
FIG. 12 relates to a fifth embodiment of the invention in which optimised reconnection is performed.

FIG. 12 outlines an approach to the provision of optimised reconnection. When the CM Function decides that the route by which a Relay 20 connects to the eNodeB 5 needs to be changed, it informs the Controlling Relay 22 (or Controlling eNodeB) of that Relay 20 that a change of routeing is required. The CM Function informs the Controlling node 22A of the target cell 50 for handover of the Relay 20. The Controlling node 22 initiates the Handover procedure for that Relay to the target node 22A. The Handover Required message is sent from controlling node 22 to target node 22A includes information on number and identity of the supported Child Relays and UEs 52 of the Relay 20 being relocated, and provides an indication of the usage characteristics.

The Target Controlling Node 22A creates the necessary resources available for the Relay 20 that is being relocated, requests the necessary transport resources from its Parent Node eNode B 5 (which in turn triggers its parent node—if there is one—to ensure transport resources are available). The Target Controlling Node 22A creates a Handover Command message indicating the resource allocation to use on the target cell 50, and a mapping of resources to child UEs 52 and child Relays (depending on the Transport design of the link).

From the above example in FIG. 12, before the Handover Command message can be sent by Cell E 50 to Cell F, Cell E needs to contact Cell B to request the establishment of the necessary Transport Resources for the incoming UEs 52 and Relays (i.e. similar to the lines between Cell C and Cell F).

The UEs 52 are not informed of the movement of a parent Relay 20 to a new position in the Relay System tree.

When the Relay 20 has been successfully Relocated, the Resources allocated by Cell C for the UEs 52 and the Relays 20 that have been moved can be released.

The headings used in this description shall have no effect on the meaning to be given to any part of the description.

The invention claimed is:

1. A mobile telecommunications network including a plurality of nodes, each serving one or more cells, and a network core (3), wherein a plurality of mobile telecommunications devices are registered with the network and communicate with the network core via the nodes, wherein the mobile telecommunications devices are provided with a respective subscriber identity module (SIM), and wherein authentication information is stored thereon under the control of the mobile telecommunications network core, wherein the mobile telecommunications network core 3 itself stores details of each of the SIMs issued under its control, wherein a plurality of relays, each serving a cell, are provided between at least one of said nodes (5) and at least one of said telecommunications devices (1) to extend the radio coverage provided by the said node (5), and wherein one of said relays comprises a joining relay (20) which is operable to connect to said node (5) via another of said relays (22), the network including an analyzer that analyzes characteristics of the path between the joining relay (20) and the network core (3) and for selectively changing the path to facilitate optimization of the path between the joining relay (20) and the network core (3).

2. The network of claim 1, wherein said node (5) includes said analyzer.

3. The network of claim 1, wherein said analyzer is operable to receive neighbor cell information from the joining relay (20).

4. The network of claim 3, wherein said analyzer is operable to analyze the characteristics of a path portion between each of the neighbor cells and the said node (5) and to analyze the characteristics of a path portion between the joining relay (20) and each of the neighbor cells in order to determine the optimum path between the joining relay (20) and the said node (5).

5. The network of claim 1, wherein the joining relay (20) includes said analyzer, and wherein said analyzer is operable to receive information regarding the characteristics of each path portion between neighbor cells of the joining relay (20) and the said node (5).

6. The network of claim 5, wherein the joining relay is operable to measure neighbor cell characteristics and to select the path between the joining relay (20) and the said node (5), which path includes one of the neighbor cells, in dependence upon the neighbor cell characteristics and the characteristics of the or each path portion between each of the neighbor cells of the joining relay (20) and the said node (5).

7. The network of claim 5, wherein the information regarding the characteristics of the or each path portion between the neighbor cells of the joining relay (20) and the said node (5) includes a handicap or offset that is applied to the measured neighbor cell characteristics to select the path between the joining relay (20) and the said node (5).

8. The network of claim 1, wherein the analyzer is operable to determine whether elements in the path between the joining relay (20) and said network core (3) are suitable for connection to the joining relay (20).

9. The network of claim 8, wherein the elements comprise one or more of said plurality of relays, which include a generator for generating an indication of whether they are suitable for connection to the joining relay, and/or one of said plurality of nodes, which includes a generator for generating an indication of whether it is suitable for connection to the joining relay.

10. The network of claim 9, wherein the relays are operable to generate an indication that they are unsuitable for connection to the joining relay if the total number of relays in the path exceeds a maximum value.

11. A method of operating a mobile telecommunications network including a plurality of nodes, each serving one or more cells, and a network core (3), wherein a plurality of mobile telecommunications are registered with the network and communicate with the network core via the nodes, wherein the mobile telecommunications devices are provided with a respective subscriber identity module (SIM), and wherein authentication information is stored thereon under the control of the mobile telecommunications network core, wherein the mobile telecommunications network core 3 itself stores details of each of the SIMs issued under its control, wherein a plurality of relays, each serving a cell, are provided between at least one of said nodes (5) and at least one of said telecommunications devices (1) to extend the radio coverage provided by the said node (5), and wherein one of said relays comprises a joining relay (20) which is operable to connect to said node (5) via another of said relays (22), the method including analyzing characteristics of the path between the joining relay (20) and the network core (3) and selectively changing the path to facilitate optimization of the path between the joining relay (20) and the network core (3).

12. The method of claim 11, wherein the joining relay (20) provides neighbor cell information for use in the analyzing step.

13. The method of claim 12, including analyzing the characteristics of a path portion between each of the neighbor cells and the said node (5) and analyzing the characteristics of a path portion between the joining relay (20) and each of the neighbor cells in order to determine the optimum path between the joining relay (22) and the said node (5).

14. The method of claim 11, wherein the analyzing step is performed by the joining relay (20) and includes analyzing received information regarding the characteristics of the or each path portion between neighbor cells of the joining relay (20) and the said node (5).

15. The method of claim 14, wherein the joining relay (20) measures neighbor cell characteristics and selects the path between the joining relay (20) and the said node (5), which path includes one of the neighbor cells, in dependence upon the neighbor cell characteristics and the characteristics of the or each path portion between each of the neighbor cells of the joining relay (20) and the said node (5).

16. The method of claim 14, wherein the information regarding the characteristics of the or each path portion between the neighbor cells of the joining relay (20) and the said node (5) includes a handicap or offset that is applied to the measured neighbor cell characteristics to select the path between the joining relay (20) and the said node (5).

17. The method of claim 11, wherein the analyzing step includes determining whether elements in the path between the joining relay (20) and said network core (3) are suitable for connection to the joining relay (20).

18. The method of claim 17, wherein the elements comprise one or more of said plurality of relays, which include a generator for generating an indication of whether they are suitable for connection to the joining relay, and/or one of said plurality of nodes, which includes a generator for generating an indication of whether it is suitable for connection to the joining relay.

19. The method of claim 18, wherein the relays generate an indication that they are unsuitable for connection to the joining relay if the total number of relays in the path exceeds a maximum value.

* * * * *